US 9,339,873 B2

(12) United States Patent
Hecht

(10) Patent No.: US 9,339,873 B2
(45) Date of Patent: May 17, 2016

(54) CUTTING INSERT HAVING A DOVETAIL ANTI-SLIP ARRANGEMENT

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 344 days.

(21) Appl. No.: 14/103,228

(22) Filed: Dec. 11, 2013

(65) Prior Publication Data

US 2015/0158090 A1    Jun. 11, 2015

(51) Int. Cl.
| B23B 27/16 | (2006.01) |
| B23C 5/22 | (2006.01) |
| B23C 5/20 | (2006.01) |

(52) U.S. Cl.
CPC ............... *B23B 27/16* (2013.01); *B23C 5/207* (2013.01); *B23C 5/22* (2013.01); *B23C 5/2221* (2013.01); *B23C 2200/0433* (2013.01); *B23C 2200/083* (2013.01); *B23C 2200/161* (2013.01); *B23C 2200/203* (2013.01); *B23C 2210/16* (2013.01); *B23C 2210/168* (2013.01); *Y10T 407/23* (2015.01)

(58) Field of Classification Search
CPC ............... B23B 27/16; B23B 2200/16; B23B 2200/161; B23B 2200/162; B23B 2200/163; B23B 2200/167; B23C 5/22; B23C 2200/16; B23C 2200/161
See application file for complete search history.

(56) References Cited

U.S. PATENT DOCUMENTS

| 2,025,308 | A | * | 12/1935 | Redinger | ............... | B23C 5/2468 |
| | | | | | | 144/230 |
| 2,189,801 | A | * | 2/1940 | Johnson | ................ | B23C 5/2455 |
| | | | | | | 407/39 |
| 2,944,323 | A | * | 7/1960 | Stadler | .................... | B23B 27/16 |
| | | | | | | 407/110 |
| 4,335,983 | A | | 6/1982 | Wermeister et al. | | |
| 5,746,549 | A | | 5/1998 | Kress et al. | | |
| 5,810,518 | A | * | 9/1998 | Wiman | ................. | B23B 27/065 |
| | | | | | | 407/102 |
| 6,290,436 | B1 | * | 9/2001 | Qvarth | .................... | B25C 5/207 |
| | | | | | | 407/113 |
| 7,578,641 | B2 | * | 8/2009 | Andersson | ............ | B23C 5/2208 |
| | | | | | | 407/103 |
| 8,313,270 | B2 | * | 11/2012 | Hecht | ..................... | B23C 5/109 |
| | | | | | | 407/113 |
| 2010/0054873 | A1 | | 3/2010 | Men et al. | | |
| 2010/0254774 | A1 | | 10/2010 | Hecht | | |
| 2013/0183112 | A1 | | 7/2013 | Schwagerl et al. | | |
| 2014/0169892 | A1 | | 6/2014 | Hecht | | |

FOREIGN PATENT DOCUMENTS

WO    WO 2005/118192 A1    12/2005

OTHER PUBLICATIONS

International Search Report dated Feb. 18, 2015 issued in PCT counterpart application (No. PCT/IL2014/050999).

* cited by examiner

*Primary Examiner* — Will Fridie, Jr.
(74) *Attorney, Agent, or Firm* — Womble Carlyle

(57) ABSTRACT

A cutting insert has a dovetail anti-slip arrangement for securing the cutting insert to a machine tool. The anti-slip arrangement includes first and second insert abutment surfaces having dovetail portions, each of which form an external and acute dovetail angle with an insert base surface. The dovetail portions are configured with one or more geometric features related to a cutting edge geometry of the cutting insert.

22 Claims, 7 Drawing Sheets

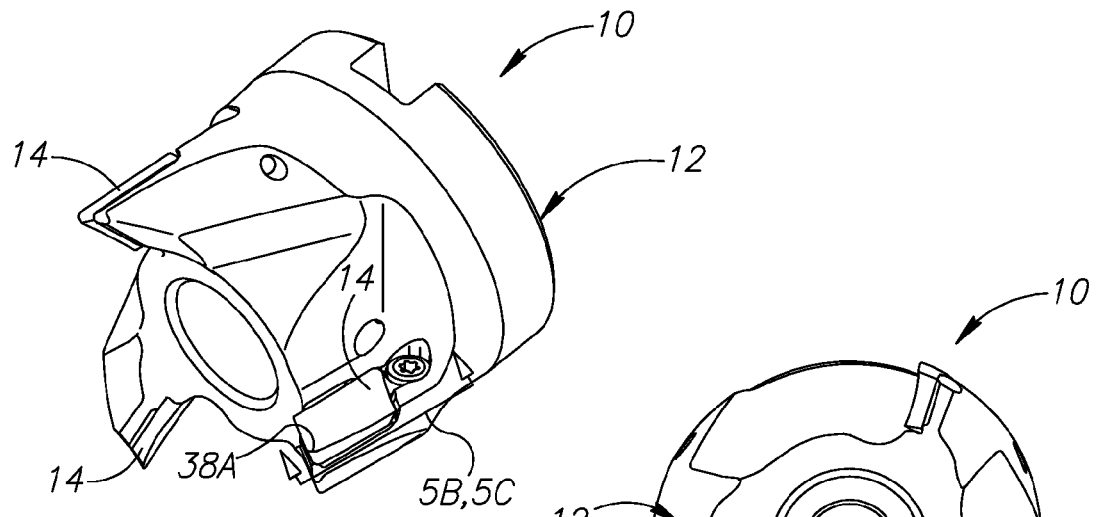
FIG.1A
FIG.1B
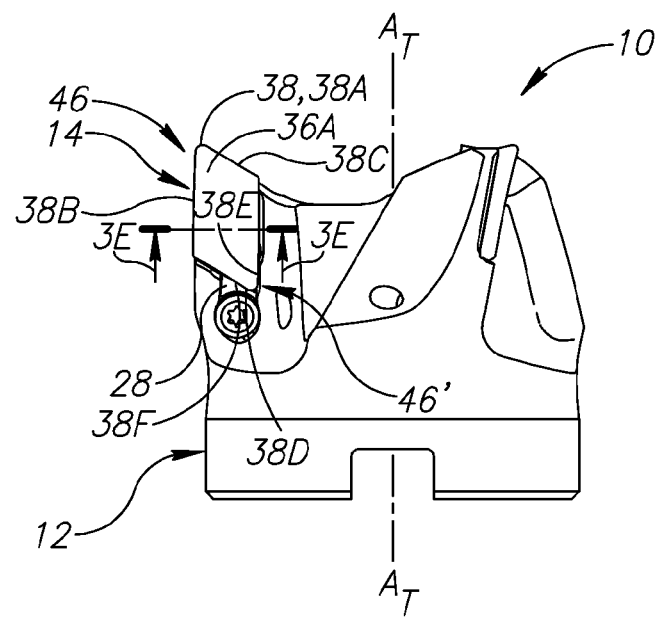
FIG.1C

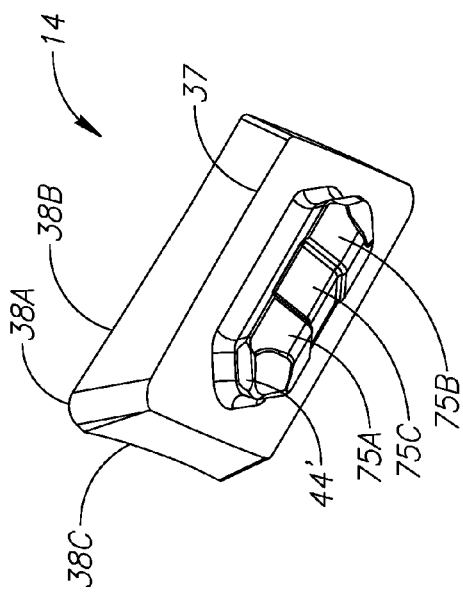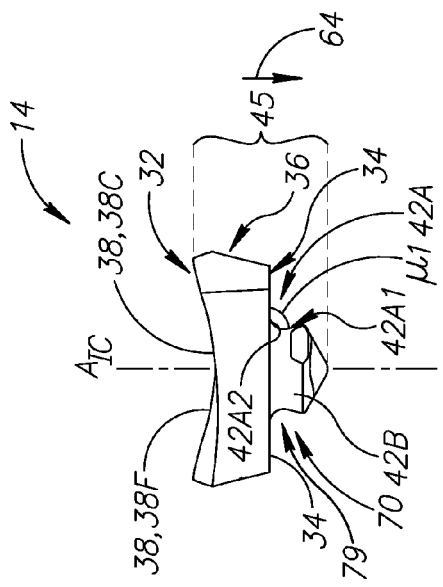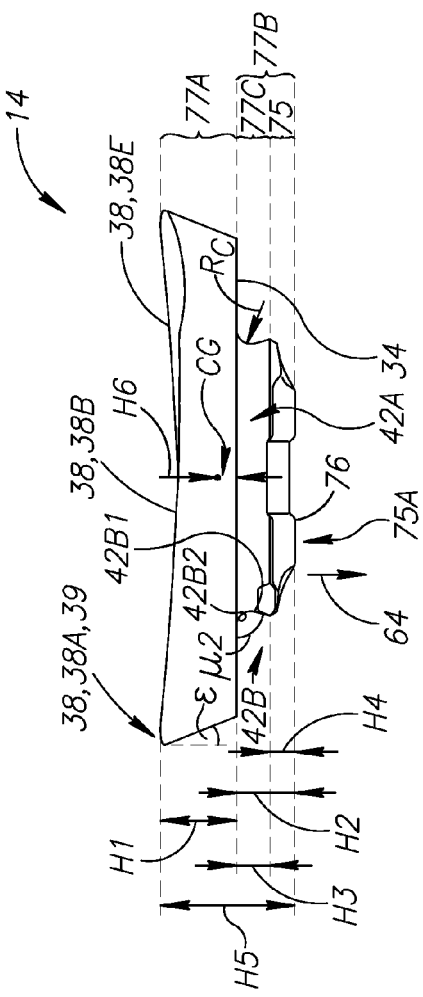

CUTTING INSERT HAVING A DOVETAIL ANTI-SLIP ARRANGEMENT

FIELD OF THE INVENTION

The subject matter of the present application relates to a cutting insert comprising a dovetail anti-slip arrangement for securing the cutting insert to a machine tool.

BACKGROUND OF THE INVENTION

Precise positioning of a cutting insert on a tool can allow for high precision machining. However, cutting inserts are often subjected to high forces during machining operations which can cause displacement or change of orientation of the cutting insert relative to a machine tool which holds it.

U.S. Pat. No. 4,335,983 discloses a cutting insert 5 with inclined side surfaces 22, 23, as seen in FIG. 6 that reference. The cutting inserts 5 are clamped in place by a biasing force applied to another inclined side surface 25 thereof.

U.S. Pat. No. 5,746,549 discloses a cutting insert with a "snap-action locking means". The cutting insert has a protuberance ("projection 23") extending downwardly from an insert base surface, the protuberance having a "lock surface 27" engageable by a locking element or member 29. The tool can also comprise an ejection element 39 for applying an ejection force against the tension force applied by the locking element 29. Another publication showing a protuberance is EP 1 753 576.

SUMMARY OF THE INVENTION

In accordance with a first aspect of the subject matter of the present application, there is provided a cutting insert with an insert dovetail anti-slip arrangement adjacent to an insert base surface thereof.

In accordance with a further aspect of the subject matter of the present application, there is provided a cutting insert comprising opposing insert top and base surfaces which are connected by an insert peripheral surface, and an insert dovetail anti-slip arrangement adjacent to the insert base surface and comprising first and second insert abutment surfaces and an insert actuator surface; the first insert abutment surface comprising a first dovetail portion forming an external and acute first dovetail angle with the insert base surface; the second insert abutment surface comprising a second dovetail portion forming an external and acute second dovetail angle with the insert base surface; wherein: in a view perpendicular to the insert base surface, the first dovetail portion is longer than and non-parallel with the second dovetail portion; and the cutting insert has a solid construction.

It is noted that all anti-slip arrangements (insert or tool) in the present application are so-called "dovetail" anti-slip arrangements, i.e. comprising non-parallel dovetail portions forming an acute dovetail angle with an associated base surface. For the sake of conciseness, the words "anti-slip arrangement" may appear hereinafter without the preceding word "dovetail" but should be construed as having the same meaning. Similarly, for conciseness, the words "anti-slip arrangement" may appear hereinafter without a preceding word "insert" or "tool" if the context clearly refers to an anti-slip arrangement of one or the other.

It is also noted that a view perpendicular to a base surface can also be a sectional view, and can alternatively be a view along an insert central axis extending perpendicular to, and through the center of, the insert base surface.

In accordance with still a further aspect of the subject matter of the present application, there is provided a cutting insert comprising opposing insert top and base surfaces which are connected by an insert peripheral surface, a protuberance extending from and surrounded by the insert base surface and spaced apart from the insert peripheral surface, and a dovetail anti-slip arrangement formed on the protuberance and comprising first and second insert abutment surfaces respectively comprising first and second dovetail portions which are non-parallel to each other in a view perpendicular to the insert base surface, each respectively forming an external and acute dovetail angle with the insert base surface.

In accordance with another aspect of the subject matter of the present application, there is provided a tool with a tool dovetail anti-slip arrangement adjacent to a tool base surface thereof.

In accordance with still another aspect of the subject matter of the present application, there is provided a tool according to any of the aspects above, further comprising a clamp and a screw configured for moving the clamp.

In accordance with another aspect of the subject matter of the present application, there is provided a tool assembly comprising a tool according to any one of the aspects above and a cutting insert according to any one of the aspects above.

In accordance with still another aspect of the subject matter of the present application, there is provided a tool assembly comprising a cutting insert and a tool, both of which comprise dovetail anti-slip arrangements adjacent to base surfaces thereof. As will be further detailed below, a dovetail anti-slip arrangement of a cutting insert can have surfaces configured for use with a tool having corresponding tool dovetail anti-slip arrangement surfaces.

In accordance with yet another aspect of the subject matter of the present application, there is provided a method of clamping a cutting insert to a tool via dove-tail anti-slip arrangements thereof.

One or more of the following advantages can be achieved with an insert dovetail anti-slip arrangement formed adjacent to an insert base surface:

Insert side surfaces can be independent of a clamping function. Stated differently, the insert side surfaces can be configured (sized and/or oriented) to be spaced from all surfaces of a tool. Stated differently yet, the insert side surfaces can be configured to be free of contact with a tool. Consequently, a single tool with a tool dovetail anti-slip arrangement (corresponding to a single-sized dovetail anti-slip arrangement) can be configured to hold different shaped and/or sized cutting inserts (i.e. the side surfaces of the inserts can have different sizes and/or shapes). By contradistinction the tool disclosed in U.S. Pat. No. 4,335,983 is more restricted to use an insert of a specific peripheral shape (since the surfaces of the tool configured to contact the dovetail side surfaces 22, 23, and even the rear side surface 25 of the cutting insert thereof are configured to contact the cutting insert at predetermined positions).

An insert top surface of the cutting insert can be independent of a clamping function (for example, the insert top surface can be devoid of a protruding screw head, an outwardly projecting portion adjacent to a screw hole, or a configuration designed to receive a clamping jaw. Consequently, chips can be allowed to freely flow along the insert top surface or can be designed to control flow thereof in an advantageous manner.

A cutting insert can have a solid construction (i.e. since the dovetail portions are configured to restrict upward movement of the cutting insert relative to a tool on which it is mounted; hence there is no requirement for a relatively large screw hole, or multiple small screw holes, for receiving a screw or screws configured for providing a downward force required to hold the cutting insert to a tool). Consequently, a cutting insert can be relatively much smaller (and consequently lighter) than known inserts for high-speed machining, which can be very significant due to the large forces associated with a cutting insert's weight when rotated at high speeds.

Dovetail portions which are adjacent to an insert base surface (and are not constituted by the insert base surface itself) can provide both clamping (i.e. in a direction perpendicular to an insert base surface) and lateral anti-slippage functions.

Similarly, a tool configured for holding a cutting insert with any of the features described above can achieve one or more similar advantages:

Tool pocket side surfaces can be independent of a clamping function. Stated differently, the tool pocket side surfaces can be configured (sized and/or oriented) to be spaced from all surfaces of a cutting insert to be held thereby. Stated differently yet, the tool pocket side surfaces can be configured to be free of contact with a cutting insert.

A tool can be configured to only contact a cutting insert via a tool base surface and surfaces located at a seating region's recess. The remainder of the tool can be independent of an additional construction having a clamping function (for example, a tool can be devoid of a screw configured to directly apply a clamping force on a cutting insert or a clamping jaw configured to directly apply a clamping force on a cutting insert).

Dovetail portions which are adjacent to a tool base surface (and are not constituted by the tool base surface itself) can provide both clamping (i.e., in a direction perpendicular to a tool base surface) and lateral anti-slippage functions.

A tool can provide extra stability for clamping a cutting insert by providing a clamping force in a cutting direction.

While production of arrangements with dovetail portions are somewhat complex (compared with a relatively simple/cheap construction of a screw hole and screw), it is believed that at least one of the advantages above, or a combination thereof, can offset such a disadvantage.

Regarding advantages above related to a cutting insert having a solid construction, it is noted that such advantage can to some degree coexist with a relatively small through-hole in a cutting insert. To elaborate, a cutting insert with a solid construction and being devoid of any through-hole whatsoever is, in theory, structurally stronger than a cutting insert formed with a through-hole. Even though the dovetail anti-slip arrangement of the present application, in contradistinction to the normal through-hole/screw clamping arrangement, provides a downward clamping force to the cutting insert via the dovetail portions thereof, it will be understood that a cutting insert can still have a solid construction and be provided with a small through-hole, for example for coating without overly weakening the structure thereof. Thus, while a cutting insert with a solid construction and being devoid of a through-hole is advantageous regarding the structural strength thereof, it will be understood that a solid insert with a relatively small through-hole can still be advantageous, for example for coating purposes. To avoid unnecessarily weakening the cutting insert, such through-hole should be as small as possible. Accordingly, for the purposes of the specification and claims, a cutting insert defined as having a "solid construction" can still include a through-hole having a diameter of less than 3 mm (or a non-circular hole having an equivalent volume). Stated differently, a cutting insert having a solid construction is devoid of a through hole having a diameter of 3 mm or greater (or a non-circular hole having an equivalent volume). Preferably, such through-hole should be 2 mm or smaller, or, most preferably, even 1 mm or smaller (or a non-circular hole having an equivalent volume). It will be understood that the most structurally strong embodiment of a cutting insert can further defined as being "devoid of a through-hole" which means that the cutting insert is devoid of a through-hole of any diameter. Despite the fact that most cutting inserts comprise through-holes to provide the downward clamping force required to withstand thousands or even millions of impacts against a workpiece (in particular in milling applications) it is believed that at least one of the advantages above, or a combination thereof, can offset such disadvantage.

Regarding advantages above related to high-speed machining, it is noted that high-speed tools can be defined as those which are configured for operation in which a friction lock is insufficient to withstand centrifugal forces during rotation. Further elaboration can be found in ISO 15641. Such tools may be particularly advantageous for machining materials such as soft metals, especially aluminium.

Regarding advantages mentioned above related to slippage of the cutting insert along the tool base surface, it is noted that such slippage can include rotational and/or translational motion. The slippage preferably prevented is visible slippage, i.e. there could be sufficient constructional tolerance of the tool and/or cutting insert to allow visible relative motion thereof, which could allow the clamp to suitably position the cutting insert. However, the slippage could also be non-visible slippage, i.e. extremely small, such that it is not visible without magnification, but which can occur during cutting operations.

It will be understood that since a dovetail anti-slip arrangement of the present application is configured not only to provide a clamping function perpendicular to a base surface, but also a lateral anti-slippage function, such slippage being caused, inter alia, by cutting forces on at least one cutting edge of the cutting insert, the anti-slip arrangement can be advantageously configured with geometric features related to the cutting insert's cutting edge geometry. Some non-limiting examples of such geometric features can be one or more of a dovetail portion length, orientation or position, or, for example the number of dovetail portions in relation to the number of cutting edge portions of a cutting edge. It will be understood that reference to advantageous force distribution below is particularly pertinent for high-speed machining operations. Such geometric features can also be advantageously non-symmetric to increase stability of the cutting insert in high-speed machining operations.

It will be understood that the above-said is a summary, and that any of the aspects above may further comprise any of the features described hereinbelow. Specifically, the following features, either alone or in combination, may be applicable to any of the above aspects:

i. A cutting insert can comprise opposing insert top and base surfaces which are connected by an insert peripheral surface.

ii. A cutting edge can be formed along an intersection of an insert top surface and an insert peripheral surface. A cutting edge can extend along an entire intersection of an insert top surface and an insert peripheral surface.

iii. A cutting edge can comprise, in a view perpendicular to an insert base surface, corner edge portions connecting straight portions. More precisely, first and second cutting edge portions can extending from a corner edge portion can be straight in a view perpendicular to an insert base surface.

iv. A cutting insert can be a single-sided cutting insert. For example, a cutting insert can comprise a cutting edge only along an intersection of an insert top surface and an insert peripheral surface. A cutting edge can extend along an entire intersection of an insert top surface and an insert peripheral surface.

v. A cutting edge can comprise corner edge portions connecting straight portions.

vi. A cutting edge can comprise first and second cutting edge portions extending from different sides of a corner edge portion. A first cutting edge portion of a cutting edge can be longer than a second cutting edge portion thereof. A first cutting edge portion can, in a view perpendicular to an insert base surface, form with a first insert dovetail portion an angle of 30° or less. It was found that as the first cutting edge portion and first dovetail portion approach a parallel configuration, better force distribution can be provided by the cutting insert. Accordingly, it is preferable that a first cutting edge portion and a first insert dovetail portion form an angle of 15° or less.

vii. A cutting insert can have a number of cutting edge portions which differs from a number of indexed positions thereof. For example a parallelogram shaped cutting insert configured with two indexed positions can have four cutting edge portions (a first minor cutting edge portion sharing a common first corner edge portion with a first major cutting edge portion which is longer than the first minor cutting edge portion, and a second minor cutting edge portion sharing a common second corner edge with a second major cutting edge portion which is longer than the second minor cutting edge portion). In such example, the cutting insert can be configured to machine in a first indexed position using the first minor and major cutting edge portions, and in a second position using the second minor and major cutting edge portions. A non-symmetric anti-slip arrangement can advantageous for indexing a cutting insert as it can be designed to accommodate non-symmetric forces on the cutting insert.

viii. A cutting edge can comprise one or more major cutting edge portions. A major cutting edge portion is a longest straight cutting edge of an insert (there can be a plurality of major cutting edge portions of equal length) in a view perpendicular to an insert base surface. A cutting insert can comprise at least one major cutting edge portions which is parallel with an adjacent straight insert dovetail portion. All major cutting edge portions can be parallel with adjacent straight insert dovetail portions. Specifically, a cutting insert can comprise two parallel major cutting edge portions which are longer than all other cutting edge portions. The cutting insert can comprise exactly two dovetail portions which are longer than all other dovetail portions of the cutting insert and are parallel with the major cutting edge portions of the cutting insert.

ix. A cutting edge can comprise one or more helical shaped portions. Preferably major and minor cutting edge portions of the cutting edge are all helically shaped.

x. A cutting insert can have, in a view perpendicular to an insert top surface, a quadrilateral shape. Preferably, in such view, the cutting insert can have an elongated shape, in particular a parallelogram shape (which can be particularly suitable for ramping).

xi. An insert top surface can be configured as a rake surface.

xii. An insert peripheral surface can be configured as a relief surface.

xiii. A base surface of a cutting insert and/or tool can be planar.

xiv. An anti-slip arrangement can comprise first and second abutment surfaces. An anti-slip arrangement can comprise exactly two abutment surfaces, namely the first and second abutment surfaces. An anti-slip arrangement can comprise an actuator surface. An anti-slip arrangement can comprise exactly one actuator surface. A tool anti-slip arrangement can comprise exactly two abutment surfaces.

xv. First and second abutment surfaces of a tool and/or cutting insert can be non-parallel to each other in a view perpendicular to a respective base surface. First and second abutment surfaces can partially or, preferably, along the entire length thereof, converge towards each other. Each pair of points of the first and second abutment surfaces which are closer to an actuator surface plane than another pair of points of the first and second abutment surfaces located further from the actuator surface plane, can have a predetermined distance of greater magnitude than the latter pair of points. Pairs of closest points of the first and second abutment surfaces can lie within respective common abutment surface planes which are parallel to the actuator surface plane, are a predetermined distance apart. At least one of the predetermined distances has a greater magnitude than another predetermined distance which is associated with a pair of points further spaced from the actuator surface plane. In a perpendicular view of a tool or insert base surface, first and second abutment surfaces can extend at an insert or tool abutment angle of less than 180° to each other. First and second abutment surfaces can extend at an acute insert or tool abutment angle to each other. More preferred is an insert or tool abutment angle of between 20° to 90°. Even more preferred is a range of about 40° to about 45°.

xvi. An anti-slip arrangement of a cutting insert or tool can be adjacent to a base surface thereof. First and second insert abutment surfaces and an insert actuator surface can extend from an insert base surface in a direction away from an insert top surface.

xvii. An abutment surface of a cutting insert can comprise an insert dovetail portion forming an external and acute dovetail angle with an insert base surface.

xviii. An abutment surface of a cutting insert can comprise a concave shaped connection portion connecting an insert dovetail portion thereof to an insert base surface. Each concave shaped connection portion can have a radius $R_C$ of at least 0.05 mm. Such radius can be beneficial for providing structural strength during high-speed cutting operations. An insert dovetail portion and concave shaped connection portion together can form a protuberance abutment recess on a protuberance extending from the insert base surface.

xix. An abutment surface of a tool can comprise a dovetail portion forming an internal and acute tool dovetail angle with a tool base surface.

xx. In a view perpendicular to a base surface, a first dovetail portion can be longer than a second dovetail portion. It will be understood that such unequal length can be advantageous for cutting inserts and/or tools subjected to unequal cutting forces on different portions thereof. In such view the first dovetail portion can be at least twice the length of the second dovetail portion. The first dovetail portion can be less than four times a length of the second dovetail portion. Generally speaking, as dovetail portions are configured to withstand particular force applications thereon, it will be understood that even non-continuous dovetail portions which are, nonetheless, co-planar, are to be considered for the purposes of the specification and claims a single dovetail portion. Dovetail portions of first and second abutment surfaces can extend in an upward-inward direction. First and second insert dovetail angles can form with a base surface an external angle of between 50° to 80°. It was found that insert dovetail angles of 70° to 80° provide an advantageous force distribution.

xxi. In a view perpendicular to an insert base surface, a dovetail portion, or all dovetail portions of a cutting insert, can face outwardly from the cutting insert. To elaborate, a dovetail portion or portions can be slanted with points thereon which are further from an insert base surface tending towards an adjacent portion of a peripheral base edge in a view perpendicular to an insert base surface. Similarly, an insert actuator surface, or all insert actuator surfaces of a cutting insert, can face outwardly from the cutting insert. Conversely, in a sectional view, perpendicular to a tool base surface, each of the first and second tool abutment surfaces can face inwardly. Similarly, a tool actuator surface can face inwardly.

xxii. In a view perpendicular to the insert base surface, a first base width can be measurable between a first dovetail portion and an adjacent portion of a peripheral base edge extending along an intersection of the insert base surface and the insert peripheral surface. If the dovetail portion and the adjacent peripheral base edge are not parallel, the base width is considered to be between closest points thereof. In such view, an overall base width can be measurable parallel to, and overlapping, a first base width and extends between opposing peripheral base edges of the insert base surface. A first base width can have a magnitude equal or greater than 23% of a magnitude of an overall base width parallel therewith. It was found that by enlarging the insert's first base width an advantageously strong connection arrangement between dovetail portions of a tool and cutting insert can be achieved, despite weakening of the anti-slip arrangement structure. Nonetheless, it is believed advantageous for a first base width to have a magnitude equal to or less than 33% of a magnitude of the overall base width. Similarly, a second base width can be measurable between an additional dovetail portion which is parallel (or within an angle of less than 30°, in a manner similar to the first cutting edge portion and first dovetail portion) to the first dovetail portion, and an adjacent portion of the peripheral base edge. The second base width can have a magnitude equal or greater than 23% of a magnitude of the overall base width. Preferably, the second base width can have a magnitude equal or less than 33% of a magnitude of the overall base width.

xxiii. First and/or second dovetail portion can be elongated.

xxiv. A first dovetail portion can have a length L1 which is 35% to 50% of a length of a first major cutting edge portion. More preferably, the length is at the larger end of this range. Accordingly, the first dovetail portion can preferably have a length L1 which is preferably 42% to 48% of a length of a first major cutting edge portion.

xxv. For strength considerations, it is preferred that, in a view perpendicular to an insert base surface, the insert base surface completely surround the anti-slip arrangement. Stated differently, an insert base surface can extend along (i.e., be adjacent to) an entire insert peripheral surface. First and second insert abutment surfaces can be spaced apart from an intersection of an insert peripheral surface and an insert base surface. Similarly, an insert actuator surface can be spaced apart from an intersection of an insert peripheral surface and an insert base surface. A minimum base width between any point along a peripheral base edge, extending along an intersection of the insert base surface and the insert peripheral surface, and between an adjacent surface of the anti-slip arrangement can be at least 65% of a first base width which is measurable between a first dovetail portion and an adjacent portion of a peripheral base edge. Even more preferably the minimum base width can be at least 75% of the first base width. It will be understood that a minimum base width cannot be greater than a base width.

xxvi. A cutting insert can have 180° rotational symmetry around an insert central axis extending perpendicular to, and through the center of, an insert base surface.

xxvii. A cutting insert can be elongated. An insert cutting plane can extend perpendicular to an elongation direction of the cutting insert and can theoretically divide the cutting insert into first and second halves. The cutting insert can be mirror-anti:symmetric about the insert cutting plane. An anti-slip arrangement can have an insert actuator surface in the first half, a second insert abutment surface in the second half, and a first insert abutment surface extending into both halves. In a perpendicular view of an insert base surface, an insert anti-slip arrangement can be asymmetric about an insert longitudinal plane.

xxviii. A cutting insert can be indexable. The cutting insert can comprise an additional, i.e. a second, insert anti-slip arrangement. Preferably, a cutting insert can have exactly two anti-slip arrangements. Stated differently, a cutting insert can be configured to be indexed once. Each indexed position being for use of one anti-slip arrangement. An additional insert anti-slip arrangement can have any, or all, of the features of the first anti-slip arrangement. The cutting insert can have exactly four insert abutment surfaces. Between first and second abutment surfaces there can be an actuator surface. In a view perpendicular with an insert base surface, a cutting insert comprising a first anti-slip arrangement and a second anti-slip arrangement: can have a first insert abutment surface of the first anti-slip arrangement connecting a second insert abutment surface and an insert actuator surface of the second anti-slip arrangement; and/or a second insert abutment surface of the first anti-slip arrangement can connect a first insert abutment surface and an insert actuator surface of the second anti-slip arrangement. Between first and second insert abutment surfaces there can be an insert actuator surface extending perpendicular to an insert base surface.

xxix. An insert actuator surface, or all insert actuator surfaces of a cutting insert, can lie in an insert actuator surface plane which is oriented perpendicular to an insert base surface. Stated differently, an insert actuator surface can extend perpendicular to the insert base surface. It will be understood that for high-speed operations such orientation is particularly advantageous. To elaborate, a perpendicular orientation of the insert actuator surface and/or tool actuator surface can assist in preventing destabilization of the cutting insert or clamp comprising the tool actuator surface.

xxx. In a view perpendicular to an insert base surface, a first dovetail portion can be at least twice the length of an insert actuator surface.

xxxi. In a view perpendicular to an insert base surface, an insert actuator surface can face in a direction opposite to only a longer of the two dovetail portions (e.g., the first dovetail portion). It will be understood that a longer dovetail portion can be exposed to greater cutting forces. Accordingly, an insert actuator surface directed away from, as much as practically possible, a center of the first dovetail portion, can assist in stabilizing the cutting insert.

xxxii. An insert actuator surface, or all insert actuator surfaces of a cutting insert, can have a blunt shape. Similarly, a tool actuator surface can have a blunt shape. The bluntness of an actuator surface can be for providing a consistent or controlled force application direction. The insert or tool actuator surface can have a curvature which does not extend along, or is devoid of, portions which are tangential to surfaces connected to the insert actuator surface. The insert or tool actuator surface can be convexly curved. The insert or tool actuator surface can have a curvature which is only apparent in a magnified view (i.e., to the naked eye the insert actuator surface appears flat, yet using any magnification means, a magnifying glass, etc., some curvature is viewable). In a bottom view of the cutting insert, the insert actuator surface can follow a straight line. Preferably, exactly one of the tool and insert actuator surfaces can be planar. The most preferable configuration is that the insert actuator surface is planar.

xxxiii. A cutting insert can comprise one or more protuberances projecting from an insert base surface, and a plurality of abutment surfaces belonging to an insert anti-slip arrangement can be formed on the one or more protuberances. Preferably, a cutting insert can comprise a single protuberance. All surfaces of an insert anti-slip arrangement can be formed on the single protuberance, or one or more, protuberances. All surfaces of all anti-slip arrangements of the cutting insert can be formed on the single protuberance, or one or more protuberances. A periphery of the single protuberance can be surrounded by only insert actuator surfaces and first and second insert abutment surfaces. It will be understood that a single protuberance can be structurally stronger than a plurality of protuberances comprising an anti-slip arrangement.

xxxiv. In a view perpendicular to an insert base surface, an anti-slip arrangement or protuberance comprising same can have a non-symmetric shape (i.e. not circular, square, hexagonal etc.; for example when the dovetail portions have unequal lengths). Such shape can be advantageous for asymmetric forces on the cutting insert. Nonetheless, dovetail portions of an anti-slip arrangement, in a perpendicular view thereof, can each extend in a straight line.

xxxv. In a view perpendicular to a base surface of a tool and/or cutting insert, first and second abutment surfaces and an actuator surface of an anti-slip arrangement can be in a triangular configuration.

xxxvi. A cutting insert can have a weight of between 2 to 6 grams. By providing dovetail portions, size and consequently weight, of a cutting insert can be reduced (in theory due to the stronger structure of a cutting insert without, for example, a relatively large through hole). This can be advantageous in high-speed operations with associated large forces. It will be understood that there is, nonetheless, a need for a certain minimum amount of material required to successfully carry out machining operations. Accordingly, it was found that a preferred size of cutting insert can have a weight of between 2.5 to 4.5 grams, with a most preferred design weight being between 2.7 to 3.7 grams.

xxxvii. A cutting insert can comprise a cutting portion height measured perpendicular to an insert base surface and between the insert base surface and an uppermost point on the insert top surface most distal therefrom.

xxxviii. A center of gravity of a cutting insert can be located between 12% to 30% of the cutting portion height from the insert base surface. It will be understood that a relatively low center of gravity can assist in stabilizing a cutting insert, particularly during high-speed operations. The center of gravity, for a cutting insert of the present application, can preferably be located between 21% to 29% of the cutting portion height from the insert base surface.

xxxix. An anti-slip arrangement height can be measured parallel with the cutting portion height and from the insert base surface in a direction away from the insert top surface to a most distal lowermost point of the cutting insert. The cutting portion height can have a magnitude greater than that of the anti-slip arrangement height.

xl. A dovetail height is measureable perpendicular to the insert base surface and from the insert base surface to a most distal point of dovetail portions of the cutting insert. A dovetail height can have a magnitude less than 70% of a cutting portion height. Even more preferably, the dovetail height should have a magnitude less than 50% of a cutting portion height. However, it is preferred that a dovetail height magnitude is greater than 30% of the cutting portion height.

xli. A cutting insert can have a solid construction. The cutting insert can be devoid of a through-hole.

xlii. A cutting insert can comprise a tapering portion extending from an anti-slip arrangement in a direction away from an insert base surface.

xliii. A tool can have a central axis defining a front-to-rear direction. The central axis can be a rotation axis.

xliv. A tool can comprise a cutting end located at a front portion of the tool.

xlv. A tool can comprise a tool peripheral surface. The tool peripheral surface can extend circumferentially. The tool peripheral surface can extend rearward from the tool cutting end.

xlvi. A tool peripheral region can extend along a cutting end and/or a tool peripheral surface.

xlvii. A tool can comprise an insert seating region.

xlviii. An insert seating region can be adjacent to a tool cutting end. An insert seating region can comprise a tool base surface. The insert seating region can comprise a recess. The insert seating region can comprise first and second tool abutment surfaces. More precisely, the first and second tool abutment surfaces can be located in the recess.

xlix. A tool can comprise tool inner and peripheral regions located on opposing sides of aan insert seating region.

l. A tool can comprise a screw hole opening out at a first end to a tool inner region and extending therein.

li. A tool can have a cutting direction. The cutting direction can be defined as extending from a tool inner region towards a tool peripheral region.

lii. First and second tool abutment surfaces, in a view perpendicular to the tool base surface, can converge towards each other with increasing proximity to a tool peripheral region.

liii. In a view perpendicular to a tool base surface, a first tool dovetail portion can be non-parallel with a second tool dovetail portion.

liv. In a view perpendicular to a tool base surface, first and second tool abutment surfaces and a tool actuator surface can be in a triangular configuration.

lv. A tool can comprise tool inner and peripheral regions located on opposing sides of an insert seating region.

lvi. A tool can comprise a clamp.

lvii. A clamp can be located at a tool inner region. A clamp can be formed with a tool actuator surface. A clamp can be configured for force application in a cutting direction via a tool actuator surface. Biasing of the tool actuator surface can comprise moving the clamp in a plane parallel to the tool base surface. Biasing of the tool actuator surface can comprise moving at least a portion of the clamp in a motion direction transverse to the cutting direction. Moving the clamp can comprise moving the entire clamp in a motion direction transverse to the cutting direction. An internal direction angle formed between the cutting direction and the motion direction can be an acute angle. Preferably, the direction angle can be between 30° and 80°. A clamp's force application can be in a direction parallel to a tool's base surface.

lviii. A tool assembly can be configured such that an insert base surface contacts a tool base surface and a clamp of the tool is configured to bias a tool actuator surface against an insert actuator surface. Such biasing can consequently bias first and second insert abutment surfaces against first and second tool abutment surfaces, or, more precisely, can bias first and second insert dovetail portions against first and second tool dovetail portions. This arrangement is configured to prevent slippage of the cutting insert along the tool base surface and also to apply a clamping force on the insert base surface against the tool base surface.

lix. A tool actuator surface can extend perpendicular to the tool base surface.

lx. A tool can comprise only a single tool actuator surface.

lxi. A tool actuator surface can be formed at an end of an elongated and plate-shaped clamp protrusion.

lxii. A clamp and/or tool can be configured for linear motion of the clamp relative to the tool. Linear motion of the clamp can be in a plane parallel to a tool base surface. Linear motion of the clamp is in a direction transverse to the cutting direction.

lxiii. A tool can be formed with a track. The track can be a linear track within which a clamp is permitted linear motion. A track can be bounded by an inner wall of the tool. The track and the clamp can be configured for continuous contact of the inner wall and clamp at each position thereof.

lxiv. A clamp can have a clamp wall surface which forms an internal acute clamp angle α with a tool actuator surface. A clamp angle α can fulfill the condition 30°<α<80°.

lxv. In a clamped position, a clamp can have a clamp wall surface which contacts an inner wall of the tool.

lxvi. A slanted clamp surface can be formed on an upwardly projecting clamp projection.

lxvii. A clamp can be plate-shaped, except for an upwardly projecting clamp projection thereof.

lxviii. In a view perpendicular to a tool base surface, a first tool abutment surface can be longer than a second tool abutment surface. This can be beneficial in terms of force distribution during a machining operation.

lxix. First and second tool abutment surfaces and the tool actuator surface can be recessed within an insert seating region. More precisely, the first and second tool abutment surfaces can be formed in a recess of the seating region. The first and second tool abutment surfaces can be proximate to a tool peripheral surface and/or tool cutting end. Preferably, the first and second tool abutment surfaces can be proximate to an intersection of the tool peripheral surface and tool cutting end.

lxx. A tool or tool assembly can be devoid of a screw-fastening arrangement configured to directly clamp a cutting insert to the tool. Stated differently, a tool or tool assembly can be devoid of a screw contacting a cutting insert.

lxxi. A tool actuator surface and first and second tool abutment surfaces can be portions of a single continuous shape. For example, when the tool actuator surface is brought to a clamping position, the shape can be oval shaped.

lxxii. A tool base surface can extend along an entire boundary of a recess of the insert seating region except for a portion completed by a clamp. A tool base surface can extend continuously, except for a portion completed by a clamp. A tool can comprise a single continuous wall including the first abutment surface and the second abutment surface.

lxxiii. A first tool base width of the tool base surface which extends from, and perpendicular to, a first tool abutment surface, can be greater than a second tool base width which extends from, and perpendicular to, a second tool abutment surface. This can be beneficial in terms of force distribution during a machining operation, and most particularly during rotation of a tool.

lxxiv. A tool anti-slip arrangement and an insert anti-slip arrangement can be configured to prevent motion of the cutting insert in a plane parallel with the tool base surface and also in a direction perpendicular thereto. Stated differently, dovetail portions of the anti-slip arrangements can constitute a biasing arrangement configured to bias the insert base surface against the tool base surface.

lxxv. A biasing arrangement can be configured to allow slippage of the cutting insert along the tool base surface. The slippage allowed can be visible slippage. More precisely, a tool base surface can be sufficiently sized to allow a cutting insert to be seated and moved thereon in a cutting direction and in an opposite direction thereto. Clamping of a cutting insert to a tool can comprise sliding motion of a cutting insert's insert base surface along a tool base surface.

lxxvi. A tool assembly can be configured so that the only contacting surfaces of tool thereof which contact a periphery of a cutting insert thereof are a tool actuator surface and first and second tool abutment surfaces.

lxxvii. A tool assembly can be configured so that in a clamped position the only contacting surfaces of a cutting insert and a tool are the tool and insert actuator surfaces, first and second abutment surfaces and base surfaces. Stated differently the cutting insert and/or tool are configured so that they contact each other at exactly four surfaces.

lxxviii. The first and second tool abutment surfaces can be asymmetrically positioned relative to each other (i.e., they are positioned differently relatively to a bisection plane). It is also noted that the first and second tool abutment surfaces are asymmetrically sized relative to each other.

lxxix. First and second tool abutment surfaces can be integrally formed with the tool.

lxxx. First and second insert abutment surfaces can be integrally formed with the cutting insert.

lxxxi. A method can comprise mounting a cutting insert on a tool in a position in which an insert base surface contacts a tool base surface, and biasing a clamp's tool actuator surface against an insert actuator surface to thereby force non-parallel first and second insert abutment surfaces respectively against non-parallel first and second tool abutment surfaces.

lxxxii. A method can comprise: a tool comprising: an insert seating region comprising a tool base surface; tool inner and peripheral regions located on opposing sides of the insert seating region; and, a tool anti-slip arrangement; the tool anti-slip arrangement comprising first and second tool abutment surfaces formed adjacent to the tool base surface and being non-parallel to each other and to the tool base surface, and a clamp located at the tool inner region and comprising a tool actuator surface which is oriented perpendicular to the tool base surface; the cutting insert comprising opposing insert top and base surfaces which are connected by an insert peripheral surface, a cutting edge, and an insert anti-slip arrangement formed adjacent to the insert base surface; the insert anti-slip arrangement comprising first and second insert abutment surfaces which are non-parallel to each other and to the insert base surface, and an insert actuator surface which is oriented perpendicular to the insert base surface; wherein the method comprises: mounting the cutting insert on the tool in a position in which the insert base surface contacts the tool base surface; and biasing the clamp's tool actuator surface against the insert actuator surface, thereby biasing dovetail portions of the first and second insert abutment surfaces respectively against dovetail portions of the first and second tool abutment surfaces for both preventing slippage of the cutting insert along the tool base surface and providing a clamping force therebetween.

BRIEF DESCRIPTION OF THE DRAWINGS

For a better understanding of the subject matter of the present application, and to show how the same may be carried out in practice, reference will now be made to the accompanying drawings, in which:

FIG. 1A is a perspective view of a tool assembly;

FIG. 1B is an end view of the tool assembly in FIG. 1A;

FIG. 1C is a side view of the tool assembly in FIGS. 1A and 1B, and is also a view perpendicular to an insert top surface of the cutting insert designated as 14 in this figure;

FIG. 3A is a bottom perspective view of the cutting insert of the tool assembly in FIGS. 1A to 1D;

FIG. 3B is a side view of the cutting insert in FIG. 3A;

FIG. 3C is a side view of the cutting insert in FIG. 3B, rotated 90°;

It is also noted that FIGS. 2 and 5A are views perpendicular to a tool base surface, FIGS. 5B and 5C are views perpendicular to the tool base surface and an insert base surface, and FIG. 3D is a view perpendicular to the insert base surface.

DETAILED DESCRIPTION

Referring to FIGS. 1A to 1D, which illustrate an example tool assembly 10 comprising a tool 12, in the form of a milling tool-head, and at least one cutting insert 14 clamped thereto.

The tool assembly 10, in this non-limiting example, is configured to mill a workpiece (not shown) by rotating about a tool axis $A_T$ in a rotation direction $D_R$ (FIG. 1B). The tool axis $A_T$ defines a front-to-rear direction with the at least one cutting insert 14 located at a front end of the tool 12.

Figure 2:
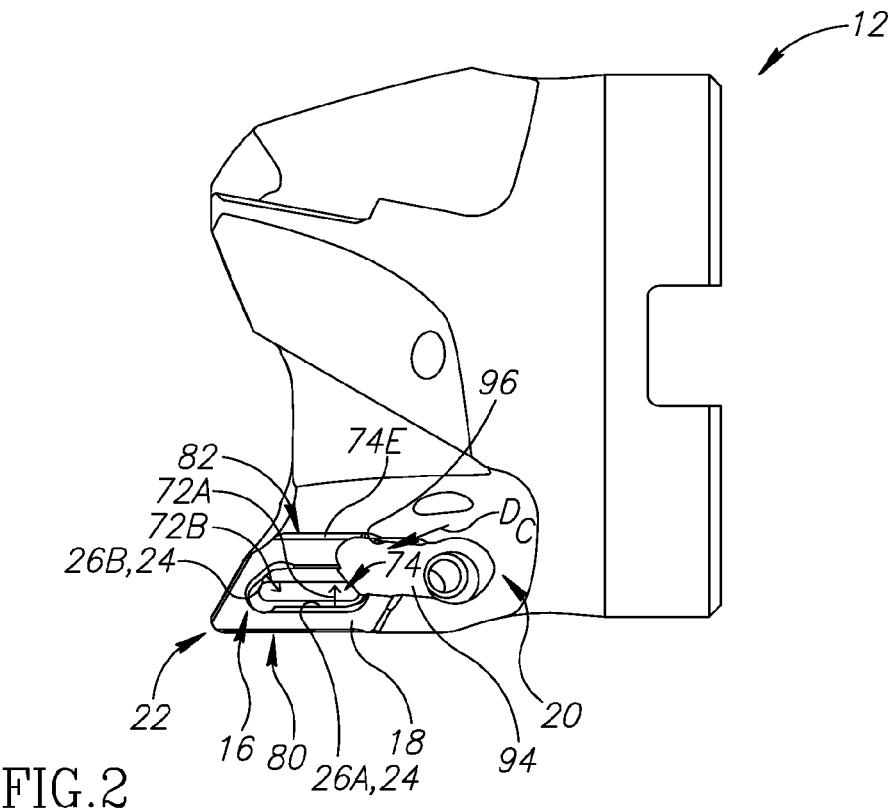
FIG. 2 is a top view of a tool base surface of a tool of the tool assembly in FIGS. 1A to 1D.

Referring also to FIG. 2, the tool 12 can comprise an insert seating region 16 comprising a planar tool base surface 18, and a tool anti-slip arrangement 24. The tool can further comprise tool inner and peripheral regions 20, 22 located on opposing sides of the insert seating region 16.

More precisely, the tool anti-slip arrangement 24 can comprise first and second tool abutment surfaces 26A, 26B formed adjacent to the tool base surface 18, and a tool actuator surface 30 (FIG. 1D) formed on a clamp 28.

The clamp 28 can be located at the tool inner region 20. The tool actuator surface 30, when the clamp 28 is mounted to the tool 12, can extend perpendicular to the tool base surface 18.

Referring also to FIGS. 3A to 3D, the cutting insert 14 has a solid construction and in this example is devoid of a through-hole.

The cutting insert 14 can comprise opposing insert top and base surfaces 32, 34 (FIG. 3C) which are connected by an insert peripheral surface 36. A cutting edge 38 is formed along an intersection of the insert top surface 32 and the insert peripheral surface 36.

An insert dovetail anti-slip arrangement 40 (FIG. 3D) is formed adjacent to the insert base surface 34. More precisely, the insert anti-slip arrangement 40 can extend from the insert base surface 34 in a direction away from the insert top surface 32 (generally speaking, in the direction designated as 64).

The insert top surface 32 is configured as a rake surface and can be, as shown, devoid of projections, which can allow machined chips (not show) to pass freely thereover.

As shown in FIG. 1C, the cutting insert 14, and more particularly a top view of the insert top surface 32, can have a parallelogram shape and can also be recessed towards the center thereof.

Figure 3D:
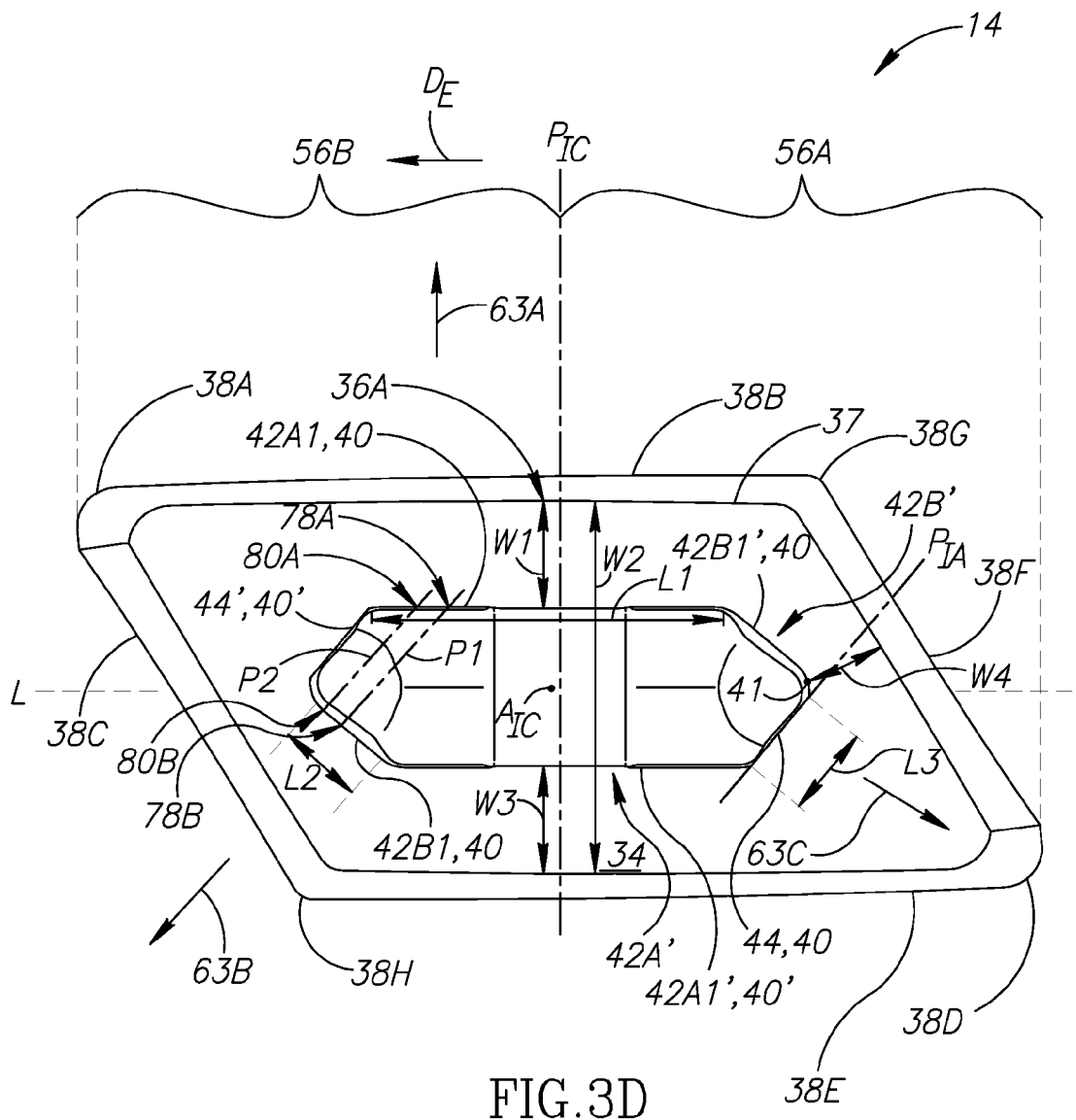
FIG. 3D is a bottom view of the cutting insert in FIGS. 3A to 3C.

Referring to FIG. 3D, the insert base surface 34 can have a parallelogram shape and can extend along a plane (i.e. can be planar).

The insert peripheral surface 36 can be configured as a relief surface. The insert peripheral surface can extend in an inward-downward direction forming an acute relief angle E (FIG. 3B).

Referring to FIGS. 3A to 3D, the cutting edge 38, in this example, extends along the entire intersection of the insert top surface 32 and the insert peripheral surface 36. More precisely, the cutting edge 38 can be theoretically divided into a first corner edge portion 38A, a first major cutting edge portion 38B connected to one side of the first corner edge portion 38A, and a first minor cutting edge portion 38C which is connected to another side of the first corner edge portion 38A.

The first minor cutting edge portion 38C can be advantageously shorter in length than the first major cutting edge portion 38B (the first minor cutting edge portion 38C being configured for ramping which typically constitutes a smaller percentage of overall machining time).

The cutting edge 38 can further be theoretically divided into a second corner edge portion 38D, a second major cutting edge portion 38E connected to one side of the second corner edge portion 38D, and a second minor cutting edge portion 38F which is connected to another side of the second corner edge portion 38D. The second cutting edge portions 38D, 38E, 38F can be identical to the opposing first cutting edge portions 38A, 38B, 38C.

In the mounted position shown in FIG. 1C, an operative cutting end 46 of the cutting insert 14 only comprises the first corner edge portion 38A, first major cutting edge portion 38B and a first minor cutting edge portion 38C. Similarly, an inoperative cutting end 46' comprises the second corner edge portion 38D, second major cutting edge portion 38E and a second minor cutting edge portion 38F. The operative and inoperative cutting ends 46, 46' alternate functions after the cutting insert 14 is indexed.

Notably, the first and second major and minor cutting edge portions 38B, 38C, 38E, 38F can all be helically shaped, which can be advantageous for high-speed machining of aluminium.

Third and fourth corner edge portions 38G, 38H (FIG. 3D) can be formed as positive cutting edges in a similar manner to the remainder of the cutting edge 38, for ease of manufacturing.

The insert anti-slip arrangement 40 is associated with the first cutting end 46, and comprises first and second insert abutment surfaces 42A, 42B and an insert actuator surface 44 which extends perpendicular to the insert base surface 34.

A periphery 45 (FIG. 3C) of the cutting insert 14 can be considered to include not only the insert peripheral surface 36, but also the insert actuator surface 44 and first and second insert abutment surfaces 42A, 42B, which are oriented transverse to the insert base surface 34.

Generally speaking, each insert abutment surface can comprise a dovetail portion and a concave shaped portion.

More precisely, as best shown in FIG. 3C, the first insert abutment surface 42A comprises a first dovetail portion 42A1 forming an external and acute first dovetail angle μ1 with the insert base surface 34, and a concave shaped first connection portion 42A2 connected, and closer than the first dovetail portion 42A1, to the insert base surface 34. The first dovetail portion 42A1 and the concave shaped first connection portion 42A2 together can form a protuberance abutment recess 79 on a protuberance 70 formed on the insert base surface, as described below.

As best shown in FIG. 3B, the second insert abutment surface 42B comprises a second dovetail portion 42B1 forming an external and acute first dovetail angle μ2 with the insert base surface 34, and a concave shaped second connection portion 42B2 connected, and closer than the second dovetail portion 42B1, to the insert base surface 34.

In this non-limiting example, the connection portions connect tangentially and directly to the dovetail portions. The curved connection portions 42A2, 42B2 provide structural strength to the cutting insert 14.

Each of the concave shaped connection portions can have a radius $R_C$ of at least 0.05 mm.

Drawing attention to FIG. 3D, the cutting insert 14 can be elongated in an elongation direction $D_E$ which is parallel with major cutting edge portions 38B, 38E of the cutting insert. The cutting insert 14 can comprise an insert cutting plane $P_{IC}$ which extends perpendicular to the insert base surface 34 and the elongation direction $D_E$. The insert cutting plane $P_{IC}$ bisects the cutting insert 14 into imaginary first and second insert halves 56A, 56B.

The insert actuator surface 44 can be entirely in the first half 56A, the second insert abutment surface 42B can be entirely in the second half 56B, and the first insert abutment surface 42A can extend into both halves 56A, 56B.

The cutting insert 14 can comprise an additional anti-slip arrangement 40' associated with the second cutting end 46'. The additional anti-slip arrangement 40' can comprise an additional insert actuator surface 44', and additional first and second insert abutment surfaces 42A', 42B'.

The surfaces of the two anti-slip arrangements 40, 40' can interpose each other. To explain, for example, the insert actuator surface 44 of the first anti-slip arrangement 40 can extend between the first and second insert abutment surfaces 42A', 42B' of the second anti-slip arrangement 40'. In this manner, each surface of a given anti-slip arrangement 40, 40' is located between two insert abutment surfaces of belonging to the other anti-slip arrangement 40', 40.

The cutting insert 14 can have an insert longitudinal axis L (FIG. 3D) which passes midway between the major cutting edge portions 38B, 38E and intersects the minor cutting edge portions 38C, 38F. The cutting insert 14 can have 180° rotational symmetry around an insert central axis $A_{IC}$ (FIG. 3D). The insert central axis $A_{IC}$ can extend perpendicular to, and through the center of, the insert base surface 34. The insert central axis $A_{IC}$ can also perpendicularly intersect the insert longitudinal axis L.

The first insert abutment surface 42A (or more precisely the dovetail portion 42A1 can have a first insert abutment length L1. The second insert abutment surface 42B can have a second insert abutment length L2, which is smaller than the first insert abutment length L1. The insert actuator surface 44 can have an actuator length L3, which is also smaller than the first insert abutment length L1.

The first and second insert abutment surfaces 42A, 42B and the insert actuator surface 44 can face outward from the cutting insert 14 (exemplified by outwardly directed arrows designated 63A, 63B and 63C).

Notably, the insert actuator surface 44 faces in a direction opposite to only the first dovetail portion 42A1. Stated differently, a projection of the insert actuator surface 44 in a direction opposite to the arrow 63C intersects only the first dovetail portion 42A1, and not the adjacent surfaces of the additional second dovetail portion 42B 1' or the additional actuator surface 44'.

In the view shown in FIG. 3D, the first and second insert abutment surfaces 42A, 42B are non-parallel. They can converge in the direction of the first minor cutting edge portion 38C. More precisely, using another perpendicular view, namely FIG. 5B, an internal cutting insert abutment angle $Y_{CA}$ between the first and second insert abutment surfaces 42A, 42B (or more precisely between the dovetail portions thereof) or an identical internal tool abutment angle $Y_{TA}$, between the first and second tool abutment surfaces 26A, 26B (or more precisely between the dovetail portions thereof), are shown to be less than 180° to each other, and are even shown to be acute. Each pair of abutment surfaces can form a wedge-shaped arrangement.

Figure 3E:
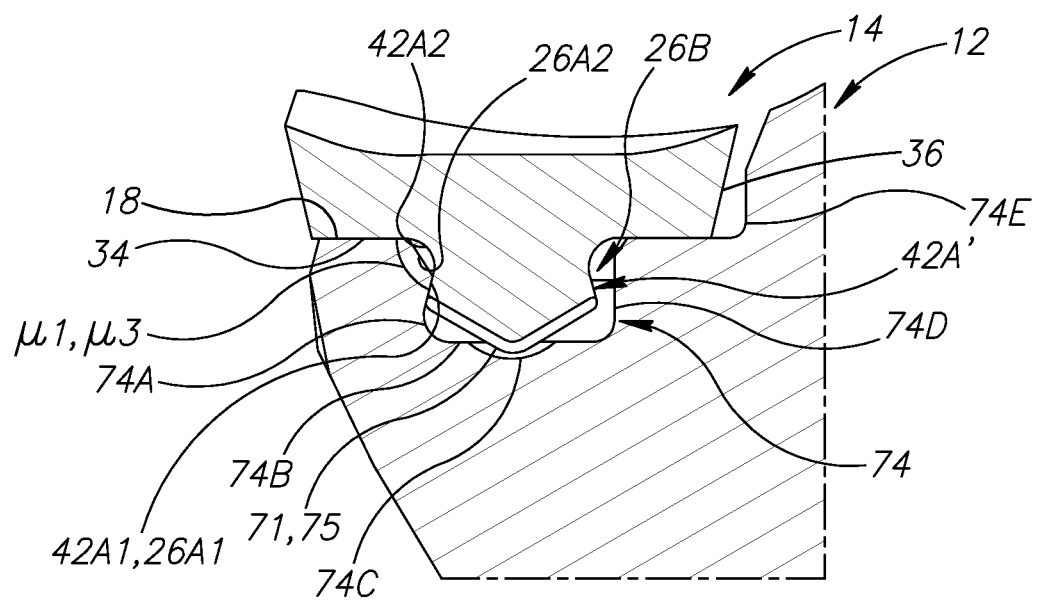
FIG. 3E is a cross section view taken along line 3E-3E in FIG. 1C.

Generally speaking, the plurality of insert abutment and actuator surfaces 42A, 42B, 44, 42A', 42B', 44' can be formed on one or more protuberances. In the present example, the first and second insert abutment surfaces 42A, 42B, and the insert actuator surface 44 are formed on a single protuberance 70 (FIG. 3C) which has a non-contacting lower protuberance surface 71 (FIG. 3E). As shown, the abutment and actuator surfaces 42A, 42B, 44, 42A', 42B', 44' of the first and second insert anti-slip arrangements 40, 40' can form all sides of, or enclose, the single protuberance 70.

Regardless of whether the insert anti-slip arrangement or arrangements 40, 40' are all formed on a single protuberance 70, all abutment and actuator surfaces thereof can be spaced apart from the insert peripheral surface 36 in a perpendicular view of the insert base surface 34. The size and dimensions of the insert base surface 34 can significantly affect machining performance of the cutting insert 14 and/or tool 12.

Before elaborating on the insert base surface 34 dimensions, it should be understood that even though, in the example shown, the first and second major cutting edge portions 38B, 38E and the dovetail portions 42A1, 42A1' of the first and additional first insert abutment surfaces 42A, 42A' are all parallel and hence an angle between the respective portions is 0° (for example an angle between the first major cutting edge portion 38B and the first dovetail portion 42A1, is 0°).

A first base width W1 is measurable between the first dovetail portion 42A1 and a peripheral base edge 37 extending along an intersection of the insert base surface 34 and the insert peripheral surface 36. More precisely, the first base width W1 is measurable between the first dovetail portion 42A1 and an adjacent portion 36A of the peripheral base edge 37.

An overall base width W2 is measurable between opposing points on the peripheral base edge 37, parallel with the first base width W1. For ease of illustration, the widths W1, W2 are shown spaced apart but should be measured from the same adjacent portion 36A.

A second base width W3 is measurable between corresponding points to the first base width W1, except on an opposing side of the cutting insert 14.

A minimum base width W4 is a smallest distance measurable between any point along a peripheral base edge 37 and an adjacent surface 41 of the anti-slip arrangement 40, in a perpendicular view of the insert base surface 34.

Referring to FIG. 3B, the cutting insert can be theoretically divided into a cutting portion 77A and a remainder portion 77B of the cutting insert.

The cutting portion 77A can be constituted by a portion of the cutting insert 14 enclosed by the insert peripheral surface 36.

The remainder portion 77B can, in this example, include an anti-slip arrangement portion 77C of the cutting insert 14 which comprises the anti-slip arrangement 40, and the tapering portion 75. The dovetail portions 42A1, 42B1 of the cutting insert 14 can be the widest portions of the remainder portion 77B. Stated differently, in the views of FIGS. 3B and 3C, noting that opposite views of the cutting insert would be identical, the dovetail portions 42A1, 42B1 project outwardly more than any other part of the remainder portion 77B.

A cutting portion height H1 is measurable perpendicular to the insert base surface 34 and between the insert base surface 34 and an uppermost point 39 on the insert top surface most distal therefrom, which in this example is at the first corner edge portion 38A (or second corner edge portion 38D which has an identical height).

An anti-slip arrangement height H2 ("remainder portion height") is measurable perpendicular to, and from, the insert base surface 34 in a direction away from the insert top surface 32 (i.e. in the downward direction 64) to a most distal lowermost point 76 of the cutting insert 14 which in this example is on the first extremity tapering portion 75A (or second extremity tapering portion 75B which has an identical height), or more precisely on the lower protuberance surface 71. It is noted that in connection with the tool 12, a downward direction is defined as a direction opposite to a direction which the tool base surface 18 faces, and that when the cutting insert 14 is clamped to the tool 12, the downward direction 64 can be identical to the tool's downward direction.

A dovetail height H3 is measureable perpendicular to, and from, the insert base surface 34 in a direction away from the insert top surface 32 (i.e. in the downward direction 64) to a most distal point of the dovetail portions of the cutting insert 14 (which in this example can be any of the dovetail portions which are all the same height, e.g. the second dovetail portion 42B1).

A tapering portion height H4 is measurable perpendicular to, and from, the most distal point of the dovetail portions of the cutting insert 14 in a direction away from the insert top surface 32 (i.e. in the downward direction 64) to a most distal point of the tapering portion 75, which in this example is on the first extremity tapering portion 75A (or second extremity tapering portion 75B which has an identical height).

An insert total height H5 is, in this example, a sum of the cutting portion height H1, dovetail height H3 and tapering portion height H4. For a cutting insert without a tapering portion 75, the insert total height H5 is a sum of the cutting portion height H1 and the dovetail height H3.

A center of gravity height H6 is measureable perpendicular to, and from, the insert base surface 34 in a direction towards the insert top surface 32 (i.e. in an upward direction opposite to the downward direction 64) to a center of gravity CG of the cutting insert 14.

Exemplary height values can be approximately: H1=2.7 mm; H2=2.1 mm; H3=1.2 mm; H4=0.9 mm; H5=4.8 mm; and H6=0.6 mm.

The first dovetail portion 42A1 can be elongated (i.e. as shown in FIG. 3D a length L1 is far longer than a dovetail height H3, shown in FIG. 3B, noting that H3 is even greater in magnitude than a height of the first dovetail portion 42A1 since it includes the first connection portion 42A2). Similarly, the second dovetail portion 42B 1 can be elongated.

Figure 3F:
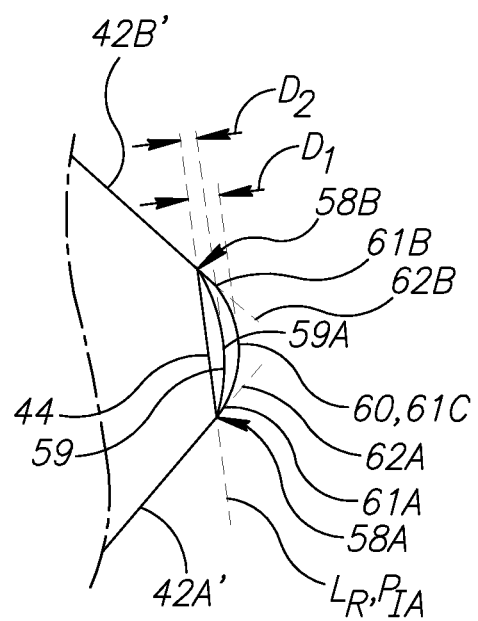
FIG. 3F is a schematic view of an abutment surface, a non-abutment surface and connecting surfaces thereto.

It will be understood that the tool actuator surface 30 and/or the insert actuator surface 44 can be more suitable for stable engagement if at least one, and preferably both, of the two has a blunt shape. Referring to FIG. 3F, the insert actuator surface 44 is planar and lies in an insert actuator plane $P_{IA}$ (also shown in FIG. 5B), which is oriented perpendicular to the insert base surface 34. It will be understood that an actuator surface which is not blunt (i.e. having a small radius of curvature, such as shown by the imaginary line designated by the numeral 60, or a V-shape) is likely to be more prone to allowing an applied force to be directed in inconsistent or uncontrolled directions, especially during application of cutting forces on a cutting insert or associated tool.

Figure 4A:
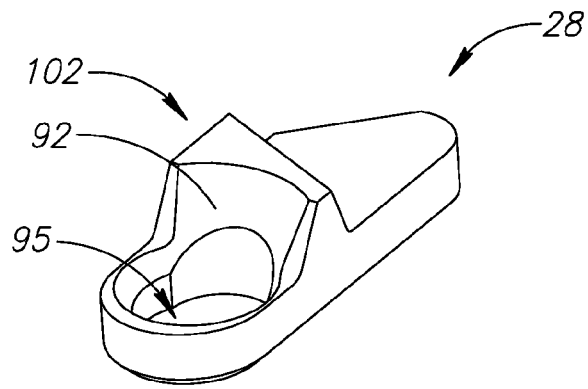
FIG. 4A is a top perspective view of a clamp of the tool assembly in FIGS. 1A to 1D.
Figure 4B:
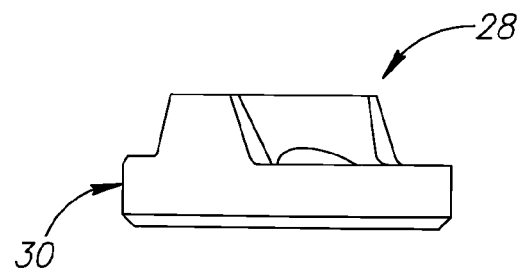
FIG. 4B is a side view of the clamp in FIG. 4A.
Figure 4C:
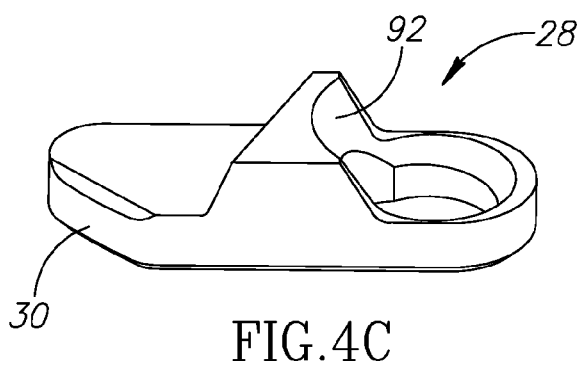
FIG. 4C is a perspective side view of the clamp in FIGS. 4A and 4B.
Figure 4D:
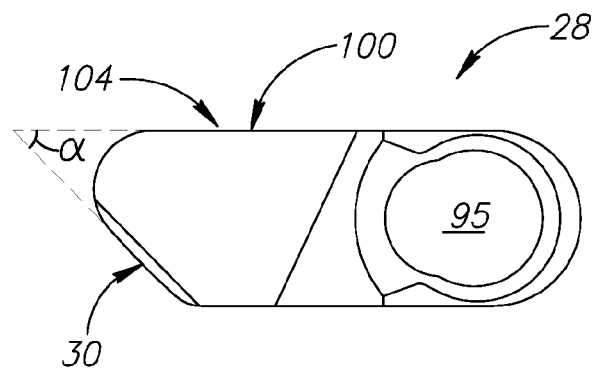
FIG. 4D is a top view of the clamp in FIGS. 4A to 4C.

Notably, while the example tool actuator surface 30 shown in FIG. 4D, appears flat/straight, it shows a slight convex curvature, if magnified.

During development of the subject matter of this application, the most preferred configuration was found to be a slightly convexly curved tool actuator surface 30 (not visible in the unmagnified views shown) together with a planar insert actuator surface 44.

To elaborate, a blunt actuator surface, using as an example the insert actuator surface 44, can be more precisely defined as having a curvature which does not extend along, or is devoid of, portions which are tangential to adjacent surfaces (e.g. additional first and second insert abutment surfaces 42A', 42B').

Referring only to FIG. 3F, to elaborate further, and for the purpose of comparison only, the imaginary non-blunt surface 60 is shown which has a smaller radius of curvature than the exemplified, and exaggeratedly curved for the purpose of understanding, insert actuator surface 44. The imaginary surface 60 has portions 61A, 61B between end points 58A, 58B and a middle section thereof, which are tangential to imaginary tangent lines 62A, 62B. The imaginary surface 60 is not considered blunt due to the small radius of curvature thereof. Rather, an actuator surface having a greater curvature, or being flat, and approaching a straight reference line $L_R$ which extends between the end points 58A, 58B is considered blunt. In summary, it is preferable that at least one of the actuator surfaces 30, 44 of the tool assembly 10 approach or tend towards being planar or flat, without being perfectly planar. It is also preferable, yet not essential, that an alternate actuator surface 30, 44 be planar. The non-flat actuator surface 30, 44 should still be flatter than an imaginary surface 60 having a curvature extending along tangent lines. Preferably, such actuator surface 30, 44 should be far flatter than such imaginary surface 60. For example, if an outermost point 61C of the imaginary surface 60 extends a first distance $D_1$ perpendicular to the straight reference line $L_R$, the outermost point of the actuator surface 44 should preferably extend a second distance $D_2$ which is 25% of, or less than, the first distance $D_1$, and, even more preferably, 10% of, or less than, the first distance $D_1$.

While not shown, it will be understood that an actuator surface can still be considered blunt in a case where there is a mere intermediary change of radius at the end points 58A, 58B. This is because the purpose of the bluntness is most relevant at the outermost point 44A, or contact point, or, at a central portion of the insert actuator surface 44, which is configured to engage an associated tool actuator surface.

Reverting to the discussion of the first and second tool abutment surfaces 26A, 26B (FIG. 1D), it is noted that they are configured for engagement with the first and second insert abutment surfaces 42A, 42B (FIG. 3D). As shown in FIGS. 2 and 3E, the abutment surfaces 26A, 26B, 42A, 42B can have shapes corresponding to the abutment surface intended to contact them (in this example, following straight lines in views perpendicular to respective base surfaces 18, 34, and also having similar lengths to a corresponding abutment surface).

Similarly, in a side view, referring now to, for example FIG. 3E, it will be understood that the first and second tool abutment surfaces 26A, 26B have dovetail portions corresponding to the first and second insert abutment surfaces 42A, 42B.

With reference only to the first tool abutment surface 26A, as the second tool abutment surface 26B has a corresponding construction (except for a shorter length in a perpendicular view of the tool base surface 18), it is noted that the first tool abutment surface 26A comprises a first tool dovetail portion 26A1 forming an internal and acute first tool dovetail angle µ3 with the tool base surface 18. As shown the first and third dovetail angles µ1, µ3 have the same magnitude.

The first tool abutment surface 26A can also be chamfered or recessed 26A2, to be spaced apart from the first connection portion 42A2. This allows only the first tool dovetail portion 26A1 and tool base surface 18 to contact the cutting insert 14, as seen in the view shown in FIG. 3E. Even though not shown in this view, it will be understood that the only other contacting surfaces are the second tool and insert dovetail portions 26B1, 42B1 of the second tool and insert abutment surfaces 26B, 42B, as well as the tool and insert actuator surfaces 30, 44. To avoid over-constraint of the cutting insert 14, all other surfaces thereof can be advantageously spaced from the tool 12. For example, a recess 74 of the seating region 16, within which the anti-slip arrangement 40 is located can have a concave shaped corner recess 74A, extending between the first tool dovetail portion 26A1 and a recess base surface 74B. In this non-limiting example where it was deemed advantageous for the cutting insert to have a tapering portion 75, the recess 74 can further comprise a niche 74C. The niche 74C can be elongated to correspond to an elongated tapering portion 75. It is further noted that the recess 74 is wider, in the view shown, than a portion of the cutting insert 14 therein. Accordingly, while the first insert abutment surface 42A contacts the recess 74 a diametrically opposed insert abutment surface 42A' is spaced apart from an inner wall 74D of the recess 74. For reasons mentioned above, the insert peripheral surface 36 can be advantageously spaced from an adjacent tool wall 74E.

As shown in FIG. 3A, the tapering portion 75 can have first and second extremity tapering portions 75A, 75B which are separated by a recessed intermediary tapering portion 75C.

To clamp the cutting insert 14 to the tool 12, the cutting insert 14 is seated on the tool 12 in a position in which the insert base surface 34 contacts the tool base surface 18. Subsequently, the clamp's tool actuator surface 30 is biased against the insert actuator surface 44 resulting in the first and second insert abutment surfaces 42A, 42B being respectively biased against the first and second tool abutment surfaces 26A, 26B (or, more precisely, the dovetail portions are brought into contact). Notably, in a clamped position, the only contact surfaces of the tool 12 and cutting insert 14 are the tool and insert base surfaces 18, 34, the tool and the insert actuator surfaces 30, 44, and the first and second insert and tool dovetail portions 42A1, 42B1, 26A1 and 26B1.

A further advantage can be possibly achieved by biasing the tool actuator surface 30 in a cutting direction $D_C$ (FIG. 2). It will be understood that a tendency of the cutting insert 14 to slide or be moved out of a desired position, can be greatest at the operative first cutting end 46 thereof (FIG. 1C) when it is in contact with a workpiece (not shown). By securing the operative first cutting end 46 of the cutting insert, through applying clamping force outward from the tool, maintenance of a precise location of the cutting insert or operative first cutting end 46 is achievable.

The cutting direction $D_C$ can be defined as extending from the tool inner region 20 towards the tool peripheral region 22. In this example, the tool peripheral region extends along the cutting end and a circumferentially extending tool peripheral surface adjacent thereto. For a tool configured to only machine in an axial direction (not shown), i.e., along the tool axis $A_T$, the tool peripheral region 22 would be only along the cutting end. For a tool (not shown) configured to only machine in a direction perpendicular to the tool axis $A_T$, the tool peripheral region 22 would be only along the tool peripheral surface.

More precisely, a cutting insert is normally mounted at a peripheral part of a tool, and normally protrudes from the tool to ensure that only the cutting insert, and not the tool contacts a workpiece (not shown). Therefore, such tool peripheral region 22 can be considered as comprising a peripheral edge 48 (FIG. 1D) proximate to a protruding cutting edge 38A (FIG. 1A) of the cutting insert 14, when mounted to the tool 12. Stated alternatively, i.e. in relation to the cutting insert 14, the cutting direction $D_C$ can be considered to extend from the inoperative cutting end 46' thereof (FIG. 1C) in towards the operative first cutting end 46 thereof.

Referring now to the abutment surfaces of the tool anti-slip arrangement 24, as shown in FIG. 2, it will be understood that they can have features corresponding to the insert anti-slip arrangement 40, mutatis mutandis.

Referring to FIG. 3D, it will be understood that there can be insert abutment surface planes, for example first and second insert abutment surface planes P1, P2, each of which are parallel to the insert actuator surface plane $P_{IA}$. It is noted that the first insert abutment surface plane P1 is closer to the insert actuator surface plane $P_{IA}$ and that a pair of points 78A, 78B of the first and second insert abutment surfaces 42A, 42B which lie on the first insert abutment surface plane P1 are spaced apart from each other a greater magnitude of distance than a pair of points 80A, 80B which lie on the second insert abutment surface plane P2. Thus, the first and second insert abutment surfaces 42A, 42B belonging to the first set of engagement surfaces converge in a direction toward the additional insert actuator surface 44' belonging to the second set of engagement surfaces and also toward the associated first cutting end 46.

Figure 5A:
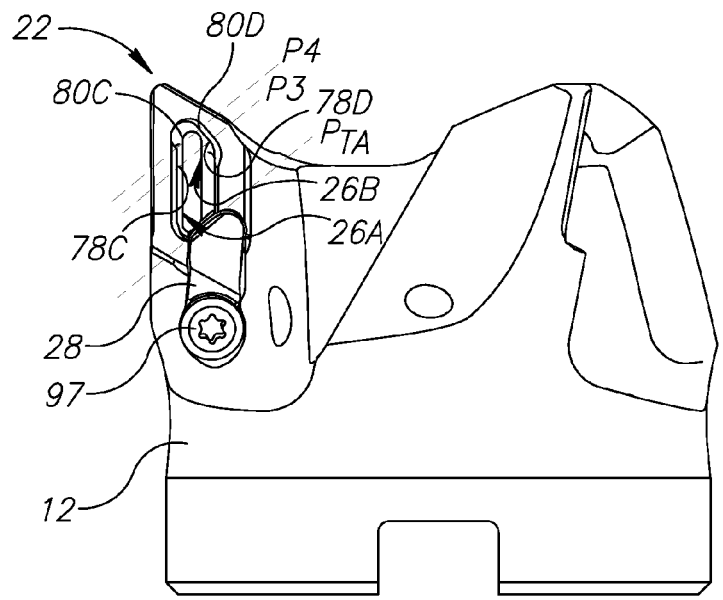
FIG. 5A is a top view of a tool, screw and clamp of the tool assembly in FIGS. 1A to 1D.

The construction above also corresponds to that of the tool anti-slip arrangement 24, mutatis mutandis (For example see FIG. 5A, wherein the tool actuator surface plane $P_{TA}$ corresponds to the insert actuator surface plane $P_{IA}$; first and second tool abutment surface planes P3 and P4 correspond to first and second insert abutment surface planes P1, P2; points 78C, 78D correspond to points 78A, 78B; and points 80C, 80D correspond to points 80A, 80B). Accordingly, tool abutment surfaces 26A, 26B converge as they tend toward the tool peripheral region 22.

The tool base surface 18 extends along the entire recess 74 of the insert seating region 16 except for a portion completed by the clamp 28. Notably, the tool base surface 18 connects the first and second tool abutment surfaces 26A, 26B, i.e., providing a continuous wall from the first abutment surface 26A to the second abutment surface 26B. Such connection can provide additional constructional strength against deflection of the first and second tool abutment surfaces 26A, 26B during a cutting operation (particularly notable at high speeds).

Figure 1D:
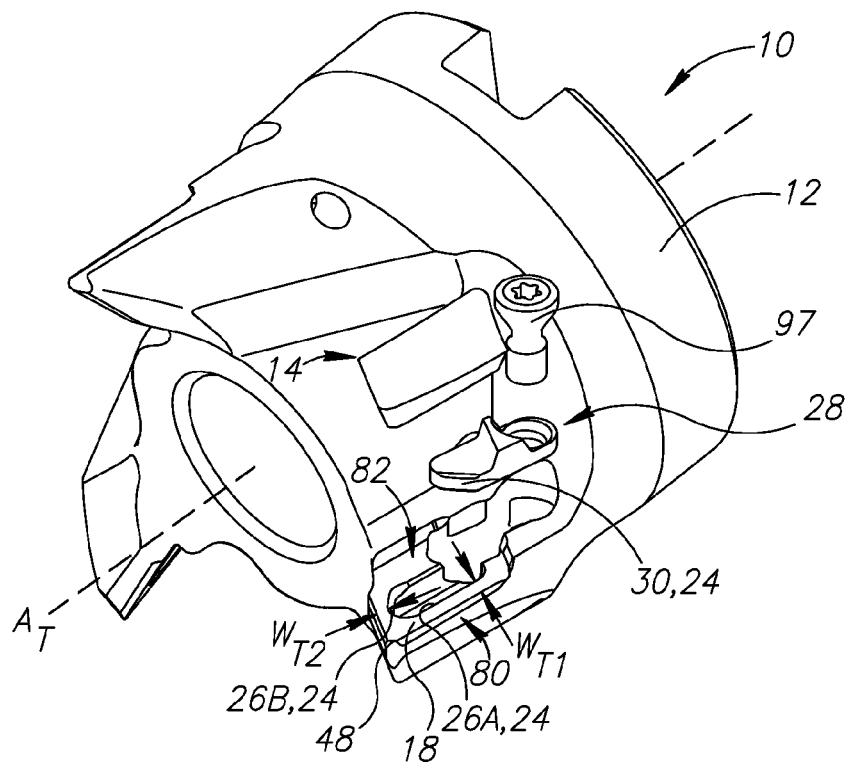
FIG. 1D is an exploded side perspective view of the tool assembly in FIGS. 1A to 1C.

Referring to FIGS. 1D and 2, a first portion 80 of the tool base surface 18 adjacent to the first tool abutment surface 26A has less material thereunder than a second portion 82 of the tool base surface 18 which is closer to the tool axis $A_T$. In such cases, it has been found that forming the first portion 80 of the tool base surface 18 to be larger than the second portion 82 of the tool base surface 18 can possibly provide advantageous constructional strength, especially in such cylindrical tools configured to rotate at high-speeds.

Such enlargement can be achieved by widening the first portion 80. For example, a first tool base width $W_{T1}$ of the first portion 80 of the tool base surface 18 which extends from, and perpendicular to, the first tool abutment surface 26A, can be greater than a second tool base width $W_{T2}$ which extends from, and perpendicular to, the second tool abutment surface 26B.

Drawing attention to FIGS. 1D, and 4A to 4D, the clamp 28 can be configured to receive a clamp screw 97 via a clamp hole 95 (FIG. 4D) formed in the clamp 28.

More precisely, the clamp 28 can comprise a slanted clamp surface 92 located between the tool actuator surface 30 and the clamp hole 95 which is configured to be abutted by the clamp screw 97.

The slanted clamp surface 92 can be formed on an upwardly projecting clamp projection 102 (i.e. projecting upwardly from the remainder of the plate shaped clamp 28).

While a clamp could conceivably comprise a bendable portion which could cause a change of position, or orientation, of a tool actuator surface, the non-limiting example shown is one where the entire clamp 28 is movable upon engagement by the clamp screw 97.

Consequently, clamping of the cutting insert 14 to the tool 12 can comprise sliding motion of the cutting insert's insert base surface 34 along the tool base surface 18.

Notably, the tool actuator surface 30 is formed at the end of an elongated and plate-shaped clamp protrusion 104. The clamp protrusion 104 extends laterally from the upwardly projecting clamp projection 102 to the tool actuator surface 30. The elongated shape allows the tool actuator surface 30 to reach the insert actuator surface 44.

It has been found that wedging at least a portion of a clamp between an insert and a tool wall can provide a stable clamping arrangement.

Figure 5B:
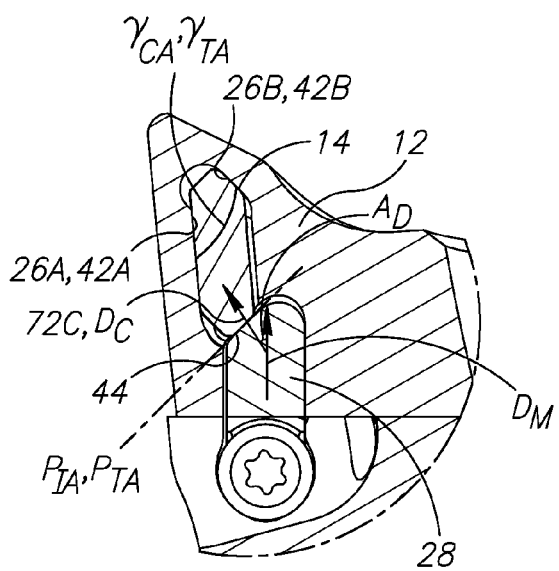
FIG. 5B is a sectional view of a portion of the tool and cutting insert taken along line "5B,5C" in FIG. 1A, notably a view perpendicular to a tool base surface and insert base surface thereof, and of the clamp and screw (the screw not being sectioned) of the tool assembly in FIGS. 1A to 1D, in a clamped position.
Figure 5C:
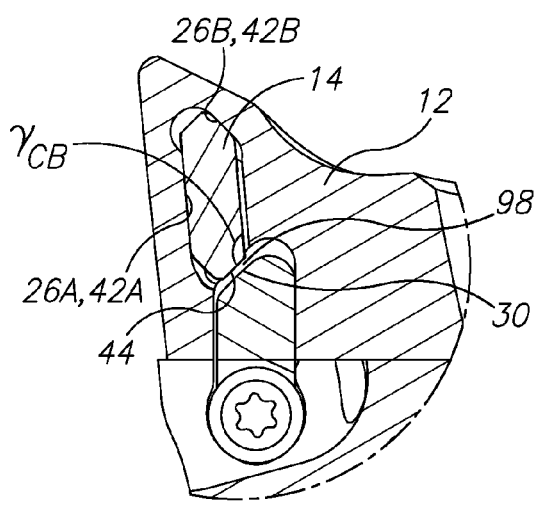
FIG. 5C is the same sectional view as in FIG. 5A, with the clamp being spaced apart from the cutting insert.

For example, referring to FIG. 5B to 5C, the clamp 28 can be moved in a motion direction $D_M$ which is transverse to the cutting direction $D_C$. FIG. 5C shows a first position wherein there is a gap 98 between the tool actuator surface 30 and insert actuator surface 44, and FIG. 5B shows contact of the tool actuator surface 30 and insert actuator surface 44.

Also referring to FIG. 2, the tool 12 can be formed with a track 94 bounded by an inner wall 96. Wedging can occur between the insert actuator surface 44 and the inner wall 96.

An internal direction angle $A_D$ formed between the cutting direction $D_C$ and the motion direction $D_M$ can be an acute angle. Preferably, the direction angle $A_D$ is between 30° and 80°.

Referring to FIG. 4D, an internal clamp angle α of a clamp wall surface 100 with the tool actuator surface 30 (or at least extensions thereof) can be an acute. The clamp angle α can fulfill the condition 30°<α<80°.

What is claimed is:

1. A cutting insert comprising
opposing insert top and base surfaces which are connected by an insert peripheral surface, and an insert dovetail anti-slip arrangement adjacent to the insert base surface and comprising first and second insert abutment surfaces and an insert actuator surface;
the first insert abutment surface comprising
a first dovetail portion forming an external and acute first dovetail angle with the insert base surface;
the second insert abutment surface comprising
a second dovetail portion forming an external and acute second dovetail angle with the insert base surface;
wherein:
in a view perpendicular to the insert base surface, the first dovetail portion is longer than and non-parallel with the second dovetail portion; and
the cutting insert has a solid construction.

2. The cutting insert according to claim 1, wherein, in a view perpendicular to the insert base surface, the first dovetail portion is at least twice the length of the second dovetail portion.

3. The cutting insert according to claim 1, wherein, in a view perpendicular to the insert base surface, the first dovetail portion is less than four times the length of the second dovetail portion.

4. The cutting insert according to claim 1, wherein:
a cutting edge is formed along an intersection of the insert top surface and the insert peripheral surface;
the cutting edge comprises first and second cutting edge portions extending from different sides of a corner edge portion;
the first cutting edge portion is longer than the second cutting edge portion and, in a view perpendicular to the insert base surface, forms with the first dovetail portion an angle of 30° or less.

5. The cutting insert according to claim 4, wherein, in a view perpendicular to the insert base surface, a first base width is measurable between the first dovetail portion and an adjacent portion of a peripheral base edge extending along an intersection of the insert base surface and the insert peripheral surface, and an overall base width is measurable parallel to, and overlapping, the first base width and extends between opposing peripheral base edges of the insert base surface; and wherein the first base width has a magnitude equal or greater than 23% of a magnitude of the overall base width.

6. The cutting insert according to claim 5, wherein the first base width has a magnitude equal to or less than 33% of a magnitude of the overall base width.

7. The cutting insert according to claim 1, wherein the cutting insert has exactly four insert abutment surfaces.

8. The cutting insert according to claim 1, wherein a protuberance projects from the insert base surface and all surfaces of the insert dovetail anti-slip arrangement are formed on the protuberance.

9. The cutting insert according to claim 1, wherein, in a view perpendicular to the insert base surface, the insert base surface completely surrounds the anti-slip arrangement, and a minimum base width between any point along the peripheral base edge, extending along an intersection of the insert base surface and the insert peripheral surface, and between an adjacent surface of the anti-slip arrangement is at least 65% of a first base width which is measurable between the first dovetail portion and an adjacent portion of a peripheral base edge.

10. The cutting insert according to claim 1, wherein the insert actuator surface extends perpendicular to the insert base surface.

11. The cutting insert according to claim 10, wherein, in a view perpendicular to the insert base surface, the first dovetail portion is at least twice the length of the insert actuator surface.

12. The cutting insert according to claim 10, wherein the insert actuator surface is planar.

13. The cutting insert according to claim 10, wherein, in a view perpendicular to the insert base surface, the insert actuator surface faces in a direction opposite only the first dovetail portion.

14. The cutting insert according to claim 1, wherein the first and second dovetail angles form with the insert base surface an external angle of between 50° to 80°.

15. The cutting insert according to claim 1, wherein the cutting insert has a weight of between 2 to 6 grams.

16. The cutting insert according to claim 15, wherein the cutting insert has a weight of between 2.5 to 4.5 grams.

17. The cutting insert according to claim 1, wherein the cutting insert is devoid of a through-hole.

18. The cutting insert according to claim 1, wherein the cutting insert comprises a cutting portion height measured perpendicular to the insert base surface and between the insert base surface and a point on the insert top surface most distal therefrom, and wherein a center of gravity of the cutting insert is located between 12% to 30% of the cutting portion height from the insert base surface.

19. The cutting insert according to claim 18, wherein the center of gravity is located between 21% to 29% of the cutting portion height from the insert base surface.

20. The cutting insert according to claim 1, wherein:
a cutting portion height is measureable perpendicular to the insert base surface and between the insert base surface and an uppermost point on the insert top surface most distal therefrom;
an anti-slip arrangement height is measureable parallel with the cutting portion height, from the insert base surface in a direction away from the insert top surface to a most distal lowermost point of the cutting insert; and
the cutting portion height has a magnitude greater than that of the anti-slip arrangement height.

21. The cutting insert according to claim 1, wherein:
a cutting portion height is measureable perpendicular to the insert base surface and between the insert base surface and an uppermost point on the insert top surface most distal therefrom;
a dovetail height is measureable perpendicular to the insert base surface and from the insert base surface to a most distal lowermost point of the dovetail portion of the cutting insert; and
the dovetail height has a magnitude less than 70% of the cutting portion height.

22. The cutting insert according to claim 21, wherein the dovetail height is greater than 30% of the cutting portion height.

* * * * *